(12) United States Patent
Yano et al.

(10) Patent No.: US 11,341,669 B2
(45) Date of Patent: May 24, 2022

(54) PEOPLE FLOW ANALYSIS APPARATUS, PEOPLE FLOW ANALYSIS SYSTEM, PEOPLE FLOW ANALYSIS METHOD, AND NON-TRANSITORY COMPUTER READABLE MEDIUM

(71) Applicant: CANON KABUSHIKI KAISHA, Tokyo (JP)

(72) Inventors: Kotaro Yano, Tokyo (JP); Hiroyuki Uchiyama, Kawasaki (JP); Yasuo Bamba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 16/508,117

(22) Filed: Jul. 10, 2019

(65) Prior Publication Data

US 2019/0333241 A1 Oct. 31, 2019

Related U.S. Application Data

(63) Continuation of application No. PCT/JP2017/046921, filed on Dec. 27, 2017.

(30) Foreign Application Priority Data

Jan. 13, 2017 (JP) .............................. JP2017-004643

(51) Int. Cl.
*G06T 7/70* (2017.01)
*G06T 7/215* (2017.01)
*G06T 7/00* (2017.01)

(52) U.S. Cl.
CPC ................ *G06T 7/70* (2017.01); *G06T 7/215* (2017.01); *G06T 7/97* (2017.01); *G06T 2207/30196* (2013.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 2008/0106599 A1* | 5/2008 | Liu | ...................... | G06K 9/3241 348/143 |
| 2010/0027875 A1* | 2/2010 | Hampapur | ......... | G06K 9/00778 382/159 |

(Continued)

FOREIGN PATENT DOCUMENTS

| | | |
|---|---|---|
| JP | 2005-242646 A | 9/2005 |
| JP | 2007-201556 A | 8/2007 |

(Continued)

OTHER PUBLICATIONS

Machine translation of JP2014006586A (Year: 2014).*

(Continued)

*Primary Examiner* — Katrina R Fujita
(74) *Attorney, Agent, or Firm* — Canon U.S.A., Inc. IP Division

(57) ABSTRACT

A people flow analysis apparatus includes an acquisition unit configured to acquire positions of persons from each of a plurality of images captured by a plurality of image capturing devices, a counting unit configured to integrate the positions of the persons in each of the plurality of images and count the number of persons on a region-by-region basis, and a display unit configured to display on a map an image expression based on the number of persons counted on the region-by-region basis.

17 Claims, 13 Drawing Sheets

(56) References Cited

U.S. PATENT DOCUMENTS

| | | | |
|---|---|---|---|
| 2011/0228984 A1* | 9/2011 | Papke | G06K 9/00771 |
| | | | 382/103 |
| 2014/0278742 A1* | 9/2014 | MacMillan | G06Q 30/0201 |
| | | | 705/7.29 |
| 2015/0199698 A1* | 7/2015 | Yoshitake | G06K 9/00335 |
| | | | 705/7.34 |
| 2015/0269443 A1* | 9/2015 | Srinivasan | G06K 9/00771 |
| | | | 382/192 |
| 2016/0241789 A1* | 8/2016 | Mayuzumi | H04N 5/232939 |
| 2017/0061644 A1* | 3/2017 | Pham | G06K 9/00778 |
| 2017/0345181 A1* | 11/2017 | Yu | G06T 7/194 |
| 2019/0045180 A1* | 2/2019 | Caicedo Fernandez | |
| | | | H04N 5/2256 |

FOREIGN PATENT DOCUMENTS

| | | |
|---|---|---|
| JP | 2009-181556 A | 8/2009 |
| JP | 2011-248836 A | 12/2011 |
| JP | 2014-006586 A | 1/2014 |
| JP | 2015-133093 A | 7/2015 |
| JP | 2016-149654 A | 8/2016 |

OTHER PUBLICATIONS

Ma et al. "A reliable people counting system via multiple cameras." ACM Transactions on Intelligent Systems and Technology (TIST) 3.2 (2012): 1-22. (Year: 2012).*

Wu et al. "Pedestrian counting based on crowd density estimation and lucas-kanade optical flow." 2013 Seventh International Conference on Image and Graphics. IEEE, 2013. (Year: 2013).*

Dalal, N., et al., "Histograms of Oriented Gradients for Human Detections", Proceedings of the IEEE Conference on Computer Vision and Pattern Recognition (CVPR), pp. 1-8.

Lempitsky, V., et al., "Learning to Count Objects in Images", Advances in Neural Information Processing Systems (NIPS) Images, pp. 1-9.

Walach, E., et al., "Learning to Count with CNN Boosting", Computer Vision—ECCV 2016, Computer Science, pp. 1-17, vol. 9906.

* cited by examiner

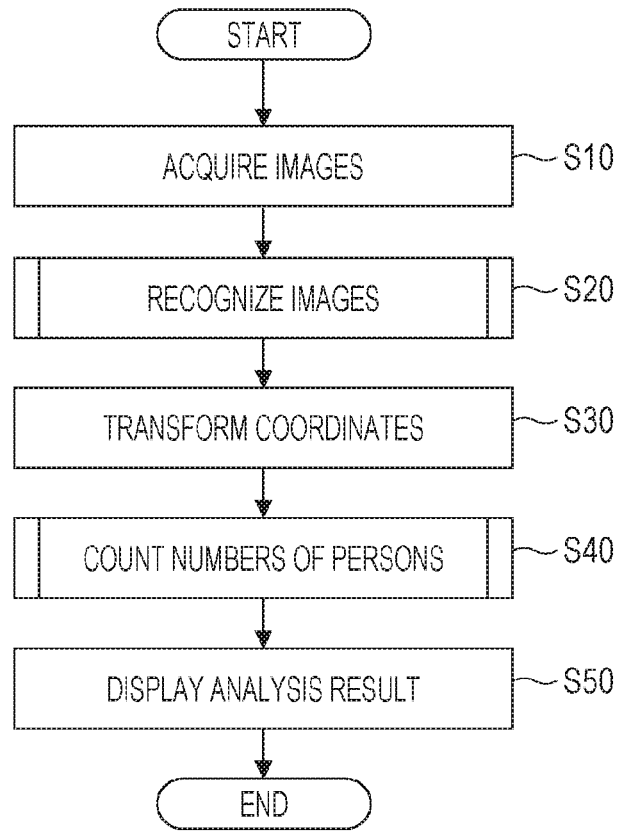
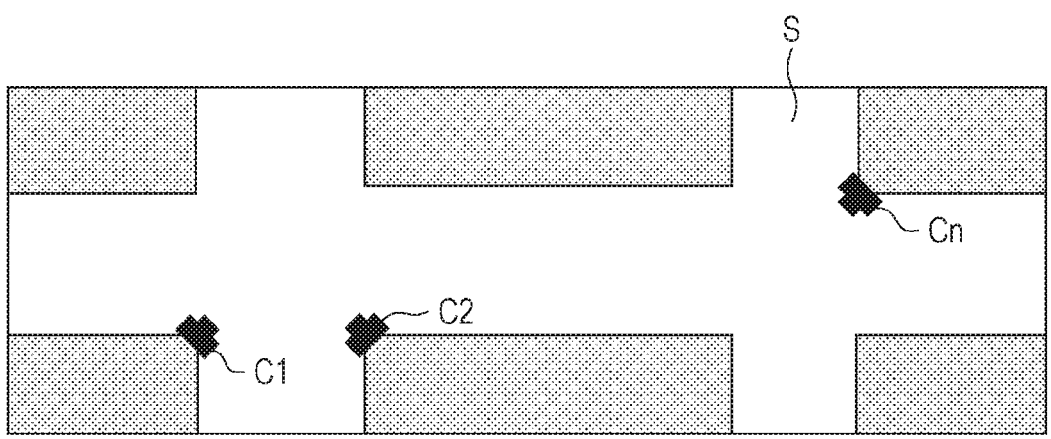

ated method for estimating the number of persons from the area of a subtracted image acquired from an input image and a background image. In addition, Japanese Patent Laid-Open No. 2007-201556 describes a method for counting the number of persons detected by a person detection unit.

PEOPLE FLOW ANALYSIS APPARATUS, PEOPLE FLOW ANALYSIS SYSTEM, PEOPLE FLOW ANALYSIS METHOD, AND NON-TRANSITORY COMPUTER READABLE MEDIUM

CROSS-REFERENCE TO RELATED APPLICATIONS

This application is a Continuation of International Patent Application No. PCT/JP2017/046921, filed Dec. 27, 2017, which claims the benefit of Japanese Patent Application No. 2017-004643, filed Jan. 13, 2017, both of which are hereby incorporated by reference herein in their entirety.

TECHNICAL FIELD

The present invention relates to a people flow analysis apparatus for counting the number of people in images captured by cameras, a people flow analysis system, a people flow analysis method, and a non-transitory computer readable medium.

BACKGROUND ART

Recently, there have been proposed methods in which a predetermined area is captured by a camera and the number of persons in a captured image is measured (counted) by analyzing the image. For example, Japanese Patent Laid-Open No. 2005-242646 describes a method for estimating the number of persons from the area of a subtracted image acquired from an input image and a background image. In addition, Japanese Patent Laid-Open No. 2007-201556 describes a method for counting the number of persons detected by a person detection unit.

However, in the above-described prior art, the number of persons is counted in an image acquired by capturing a predetermined area using one camera (an image capturing device), and thus the number of persons in a wide area that one camera cannot cover cannot be counted. In addition, in the above-described prior art, a people crowded state of the wide area cannot be viewed from above. In a case where a plurality of cameras are prepared and the methods described as the prior art are simply applied on a camera image basis, the densities of persons cannot be compared with each other when installation states differ between the cameras. For example, in a case where a relatively wide area is captured by one camera and a narrow area is captured by another camera, the people crowded states of the two areas are different from each other even when two images include the same number of persons.

The present invention provides a people flow analysis apparatus and a people flow analysis system that can appropriately count the number of target objects present in a certain region even when images captured by a plurality of image capturing devices are used.

SUMMARY OF INVENTION

A people flow analysis apparatus according to an aspect of the present invention includes an acquisition unit configured to acquire positions of persons from each of a plurality of images captured by a plurality of image capturing devices, a counting unit configured to integrate the positions of the persons in each of the plurality of images and count the number of persons on a region-by-region basis, and a display unit configured to display on a map an image expression based on the number of persons counted on the region-by-region basis.

Further features of the present invention will become apparent from the following description of exemplary embodiments with reference to the attached drawings.

BRIEF DESCRIPTION OF DRAWINGS

FIG. 3 is a diagram illustrating the procedure of processing performed by a people flow analysis system according to the exemplary embodiment of the present invention.

FIG. 4 is a diagram illustrating installation positions of image capturing devices on a map.

DESCRIPTION OF EMBODIMENTS

In the following, exemplary embodiments of the present invention will be described in detail with reference to the attached drawings. The exemplary embodiments described below are examples of a way of realizing the present invention, and are modified or changed as necessary depending on the configuration of an apparatus or a system to which the present invention is applied or in accordance with various types of conditions. The present invention is not limited to the exemplary embodiments to be described below.

Hardware Configuration of People Flow Analysis Apparatus

Figure 1:
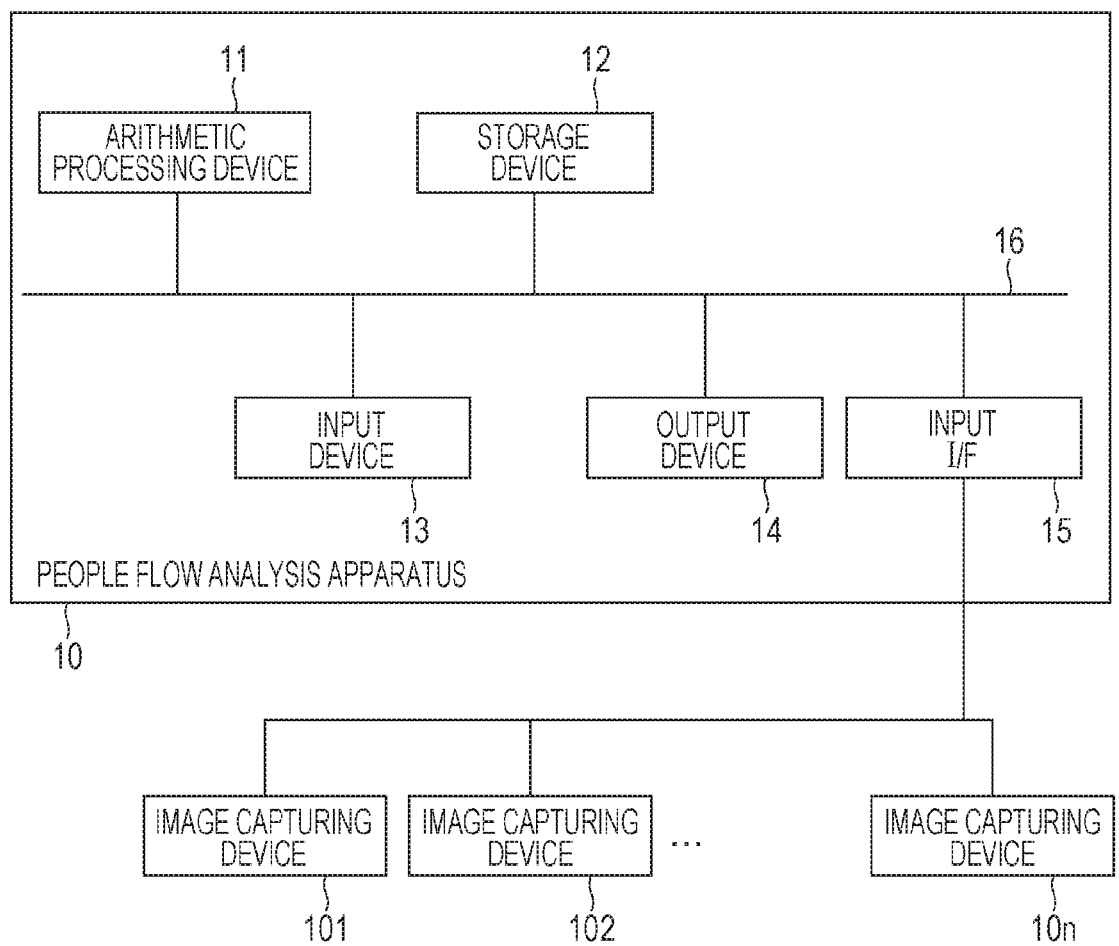
FIG. 1 is a diagram illustrating a hardware configuration of a people flow analysis apparatus according to an exemplary embodiment of the present invention.

FIG. 1 is a diagram illustrating a hardware configuration of a people flow analysis apparatus 10 according to the present exemplary embodiment. The people flow analysis apparatus 10 includes an arithmetic processing device 11, a storage device 12, an input device 13, an output device 14, and an input interface (I/F) 15. The devices 11 to 15 of the people flow analysis apparatus 10 are connected to each other by a bus 16. A plurality of image capturing devices 101 to 10n are connected to the people flow analysis apparatus 10 according to the present exemplary embodiment via the input I/F 15. The people flow analysis apparatus 10 and the image capturing devices 101 to 10n constitute a people flow analysis system. The people flow analysis apparatus 10 acquires the number of persons from images captured by the image capturing devices 101 to 10n and analyzes the density of persons in the images. The devices 11 to 14 and the image capturing devices 101 to 10n in the people flow analysis system are configured such that communication is possible therebetween.

The arithmetic processing device 11 controls an operation of the people flow analysis apparatus 10, and, for example, executes a program stored in the storage device 12. The arithmetic processing device 11 includes a central processing unit (CPU) and a graphics processing unit (GPU).

The storage device 12 is a storage device including, for example, a magnetic memory and a semiconductor memory. The storage device 12 stores, for example, a program loaded on the basis of an operation of the arithmetic processing device 11 and data that needs to be stored for a long period of time. In the present exemplary embodiment, the function of the people flow analysis apparatus 10 and processing according to the flow charts described later are realized by the arithmetic processing device 11 performing processing in accordance with the procedure of a program stored in the storage device 12. The storage device 12 stores, for example, images to be processed by the people flow analysis apparatus 10, detection results, and analysis results.

The input device 13 includes a mouse, a keyboard, a touch panel device, a button, and so on. The input device 13 inputs, for example, various instructions, information, and data.

The output device 14 includes, for example, a liquid crystal panel and external monitors, and outputs various types of information.

The input I/F 15 connects the image capturing devices 101 to 10n to the people flow analysis apparatus 10. The input I/F 15 is, for example, a serial bus interface that is compliant with standards such as USB or IEEE1394. Images captured by the image capturing devices 101 to 10n are input to the people flow analysis apparatus 10 via the input I/F 15.

The image capturing devices 101 to 10n are, for example, surveillance cameras, and acquire images (image data) of predetermined areas by performing image capturing on the areas. Each of the predetermined areas is an image-capturing area of a corresponding one of the image capturing devices 101 to 10n. The image capturing devices 101 to 10n each have a memory for storing images. The image capturing devices 101 to 10n each have an identification number (camera ID).

Note that the hardware configuration of the people flow analysis apparatus 10 is not limited to the above-described configuration. For example, the people flow analysis apparatus 10 may have an I/O device for performing communication with various devices. For example, the I/O device is a wired transmitting-receiving unit, a wireless transmitting-receiving unit, or the like. In addition, the I/O device may have an input-output unit for a memory card, a USB cable, and the like.

Functional Configuration of People Flow Analysis Apparatus

Figure 2:
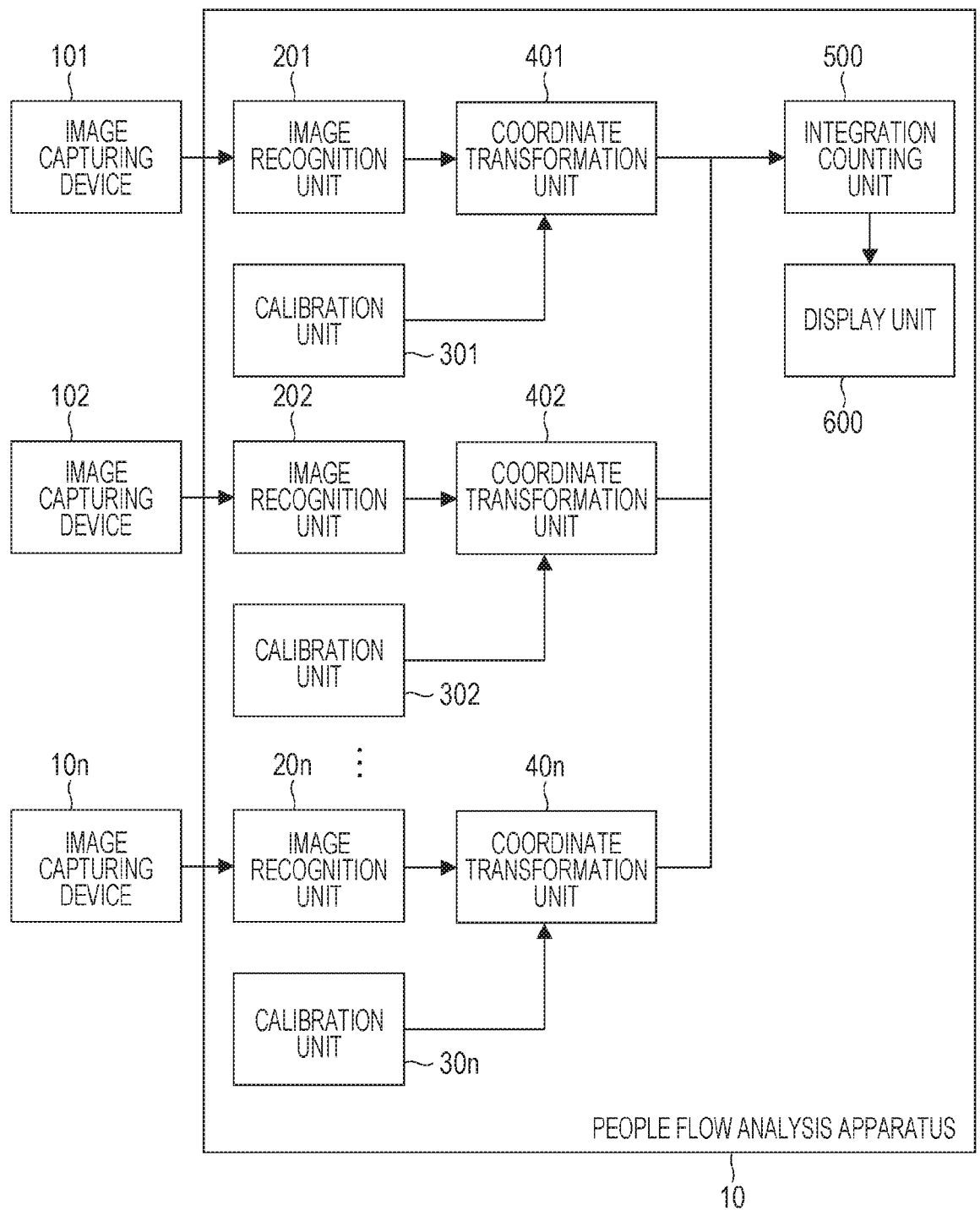
FIG. 2 is a diagram illustrating a functional configuration of the people flow analysis apparatus according to the exemplary embodiment of the present invention.

FIG. 2 is a diagram illustrating a functional configuration of the people flow analysis apparatus 10 according to the present exemplary embodiment, the people flow analysis apparatus 10 being connected to the image capturing devices 101 to 10n. Processing to be performed by and the function of the people flow analysis apparatus 10 are realized by a plurality of image recognition units 201 to 20n, a plurality of calibration units 301 to 30n, and a plurality of coordinate transformation units 401 to 40n corresponding to the image capturing devices 101 to 10n, an integration counting unit 500, and a display unit 600.

The image capturing devices 101 to 10n each acquire an image of a corresponding predetermined area by performing image capturing on the predetermined area, and output the acquired images to the image recognition units 201 to 20n.

The image recognition units 201 to 20n perform image recognition processing on the images received from the image capturing devices 101 to 10n, and each acquire (detect and estimate) the positions of persons in the corresponding one of the images. The positions of the persons are position coordinates represented by coordinates in the image. In the present exemplary embodiment, the image recognition units 201 to 20n have the same configuration, and perform the same operation (processing). The image recognition units 201 to 20n output the recognized positions of persons to the coordinate transformation units 401 to 40n.

The calibration units 301 to 30n each acquire a calibration parameter for associating coordinates in the images acquired by a corresponding one of the image capturing devices 101 to 10n with world coordinates (a standard coordinate system), which are coordinates in a common coordinate system. The calibration units 301 to 30n output the acquired calibration parameters to the coordinate transformation units 401 to 40n.

The coordinate transformation units 401 to 40n transform each of the positions of persons (the position coordinates) received from the image recognition units 201 to 20n into world coordinates, using the calibration parameters received from the calibration units 301 to 30n. The coordinate transformation units 401 to 40n output the world coordinates obtained by transforming the positions of the persons to the integration counting unit 500. Note that the coordinate transformation units 401 to 40n each have a first coordinate transformation unit 410 and a second coordinate transformation unit 420 (see FIG. 9). The first coordinate transformation unit 410 and the second coordinate transformation unit 420 will be described later.

The integration counting unit 500 integrates the world coordinates of the positions of persons received from the coordinate transformation units 401 to 40n (integrates the position coordinates into the world coordinates), and counts the number of persons on a region-by-region basis. In addition, the integration counting unit 500 generates, on the basis of the number of persons counted on a region-by-region basis, a gray-scale portion representing the density of persons (people density display), and displays the gray-scale portion on a map. In the present exemplary embodiment, a map on which people density display is performed is referred to as an analysis result. An analysis result will be described later using FIG. 11. The integration counting unit 500 outputs, using the world coordinates, the analysis result to the display unit 600.

The display unit 600 displays the analysis result received from the integration counting unit 500.

Processing Performed by People Flow Analysis System

In the following, an operation of the people flow analysis system including the image capturing devices 101 to 10n and the people flow analysis apparatus 10 will be described in accordance with a flow chart illustrated in FIG. 3.

In S10, the image capturing devices 101 to 10n acquire a plurality of images by performing image capturing in a plurality of areas. The acquired images are stored in the memories of the image capturing devices 101 to 10n. In the present exemplary embodiment, the image capturing devices 101 to 10n are installed as illustrated on a map in FIG. 4. In FIG. 4, C1 to Cn denote the positions of the image capturing devices 101 to 10n, respectively. A white region S is a region where people move such as a street or a sidewalk. The spaces (regions) on which image capturing is to be performed by the image capturing devices 101 to 10n may overlap one another or do not have to overlap. The image capturing devices 101 to 10n can record captured images together with image capturing times. By referring to the image capturing times, it becomes possible to integrate, on the world coordinates, the counted numbers of persons and analysis results acquired at almost the same time in integration processing to be described later.

In S20, the image recognition units 201 to 20n of the people flow analysis apparatus 10 perform image recognition processing on the images acquired by the image capturing devices 101 to 10n, and acquire the positions of persons in the images. In the present exemplary embodiment, the image recognition units 201 to 20n have the same configuration and perform the same operation. Thus, as a representative, the image recognition unit 201 will be described in detail below.

Configuration of Image Recognition Unit

Figure 5:
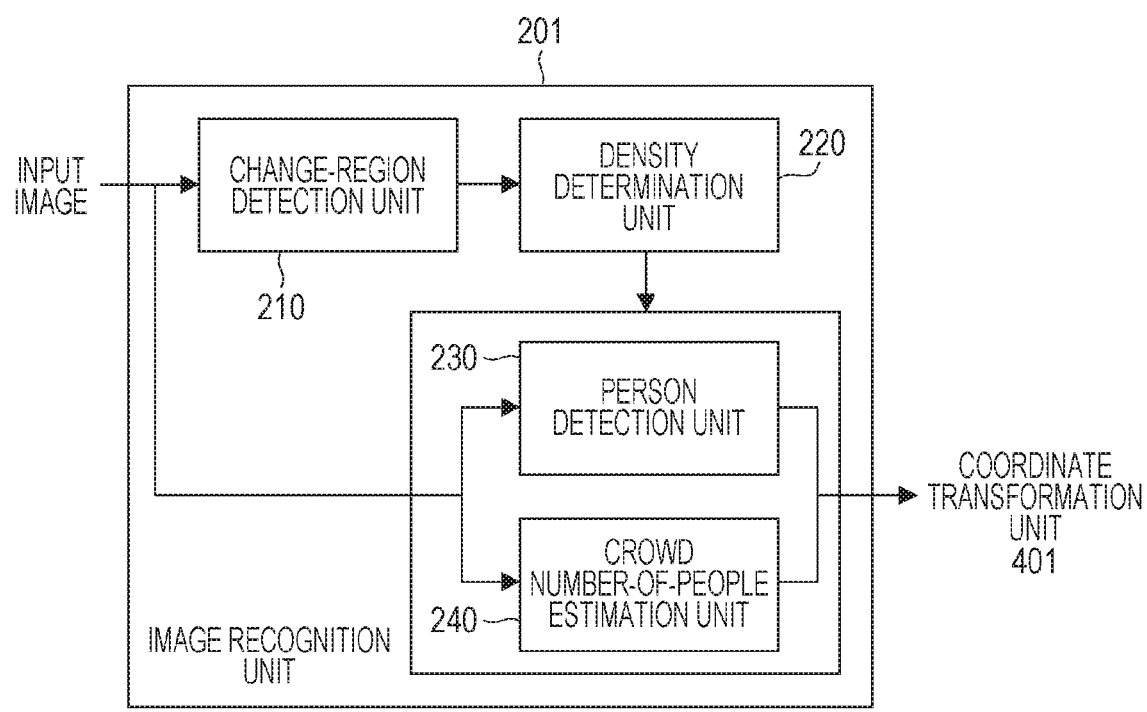
FIG. 5 is a diagram illustrating the configuration of an image recognition unit according to the exemplary embodiment of the present invention.

FIG. 5 illustrates the configuration of the image recognition unit 201. As illustrated in FIG. 5, the image recognition unit 201 has a change-region detection unit 210, a density determination unit 220, a person detection unit 230, and a crowd number-of-people estimation unit 240. An image acquired by the image capturing device 101 is input as an input image to the change-region detection unit 210, the person detection unit 230, and the crowd number-of-people estimation unit 240.

The change-region detection unit 210 detects, from the input image, regions in which temporal changes are large (change regions), and extracts the regions as a change-region image. In the present exemplary embodiment, change regions are detected using a background subtraction method to extract a change-region image. A plurality of frames of images of only a background are acquired, the images including no person, and a background image is generated in advance from the acquired images. In a background subtraction method, an input image is compared with a background image on a pixel-by-pixel basis, and pixels having a difference greater than a predetermined value are treated as change-region pixels and are distinguished from the other pixels. For example, a binary image in which change-region pixels are set to 1 and the other pixels are set to 0 is extracted as a change-region image. In this case, 1 and 0 are pixel values. The change-region detection unit 210 outputs the extracted change-region image to the density determination unit 220. Note that in a case where no change region can be detected (there is no change-region pixel), the change-region detection unit 210 outputs the detection result to the density determination unit 220. The change-region detection unit 210 detects, from an input image, regions in which temporal changes are larger than a predetermined amount.

The density determination unit 220 determines, on the basis of the change-region image extracted by the change-region detection unit 210, whether the image acquired by the image capturing device 101 (input image) is, for example, an image including a person, an image including no person, a crowded image, or an uncrowded image. In a case where there is no change-region pixel, the density determination unit 220 determines that the input image is an image including no person. For example, after determining that the input image is an image including a person, the density determination unit 220 determines whether the input image is a crowded image. The density determination unit 220 outputs the determination result to the person detection unit 230 and the crowd number-of-people estimation unit 240.

Figure 6A:
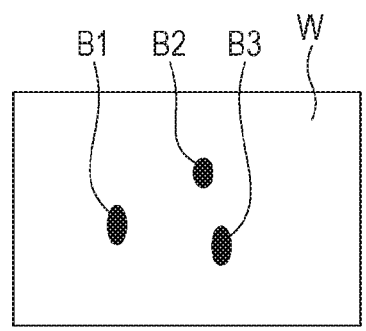
FIG. 6A is a diagram illustrating an example of a change-region image.
Figure 6B:
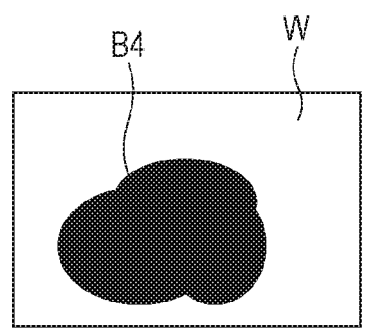
FIG. 6B is a diagram illustrating an example of a change-region image.

Differences between a crowded image and an uncrowded image will be described with reference to FIGS. 6A and 6B. In FIGS. 6A and 6B, black portions indicate change-region pixels B1 to B4 in change-region images, and white portions indicate pixels W, which are not change-region pixels. FIG. 6A illustrates an example of a change-region image in a case where an input image is an uncrowded image. In FIG. 6A, the change-region pixels B1, B2, and B3 are present in a scattered manner. This indicates that, for example, persons are present in a scattered manner in the captured image.

FIG. 6B illustrates an example of a change-region image in a case where an input image is a crowded image. In FIG. 6B, the change-region pixels B4 form a large lump. This indicates that, for example, many people are present in a gathered manner and the place is crowded in the captured image. The density determination unit 220 integrates adjacent pixels having the same pixel value in the change-region image into one lump, and acquires the size of the lump of change-region pixels. In a case where the acquired size of the lump of change-region pixels is greater than or equal to a predetermined threshold, the density determination unit 220 determines that the input image is a crowded image. In the other cases, the density determination unit 220 determines that the input image is an uncrowded image.

In this manner, the density determination unit 220 determines whether an input image is a crowded image on the basis of changes in the position coordinates of people in a change-region image (region).

Note that, in a case where the size of an input image is large, the density determination unit 220 divides the input image into blocks of a predetermined size, and performs a density determination on each of the blocks.

The person detection unit 230 detects a person from an image acquired by the image capturing device 101 (an input image). As a method for detecting a person from an image, for example, a method is used that is described in a document "Dalal and Triggs. Histograms of Oriented Gradients for Human Detection. Proceedings of the IEEE Conference on Computer Vision and Pattern Recognition (CVPR), 2005". In this document, features of histograms of oriented gradients are extracted from an image, and whether an object is a person or not is recognized using a model obtained by learning, using a support-vector machine, the extracted features of histograms of oriented gradients.

Note that the method for detecting a person from an image is not limited to this method. For example, features to be extracted do not have to be the features of histograms of oriented gradients and may be Haar-like features, local binary pattern histogram (LBPH) features, or the like, or may also be a combination of these features. In addition, the model for recognizing a person does not have to be a support-vector machine and may be an AdaBoost discriminator, a randomized tree, or the like. The person detection unit 230 outputs, as a detection result, the position coordinates of the center of a head portion of a person in an image (output of the position of a person). In this manner, the person detection unit 230 acquires the position coordinates of persons in an image. Thereafter, the person detection unit 230 outputs the detected positions of the persons to the coordinate transformation unit 401 (FIG. 5).

The crowd number-of-people estimation unit 240 estimates the number of people (the number of persons) in an image acquired by the image capturing device 101. As a method for estimating the number of people in an image, for example, a method is used that is described in a document "Lempitsky and Zisserman. Learning To Count Objects in Images. Advances in Neural Information Processing Systems (NIPS), 2010". In this document, the density of population is calculated, using a recognition model obtained by performing machine learning, from an image by performing regression estimation. For example, an input image is vertically and horizontally divided into blocks of an appropriate size, and the density of people in each of the division images (blocks), that is, the number of population in each of the blocks is estimated. In the present exemplary embodiment, the crowd number-of-people estimation unit 240 uses the method described in this document. The crowd number-of-people estimation unit 240 associates, on the basis of the estimation result of each of the blocks, the position coordinates of the center of the block with the estimated number of persons to perform output (output of the positions of persons). In this manner, the crowd number-of-people estimation unit 240 acquires the position coordinates of persons in an image. Thereafter, the crowd number-of-people estimation unit 240 outputs the positions of the persons to the coordinate transformation unit 401 (FIG. 5).

Processing Performed by Image Recognition Unit

Figure 7:
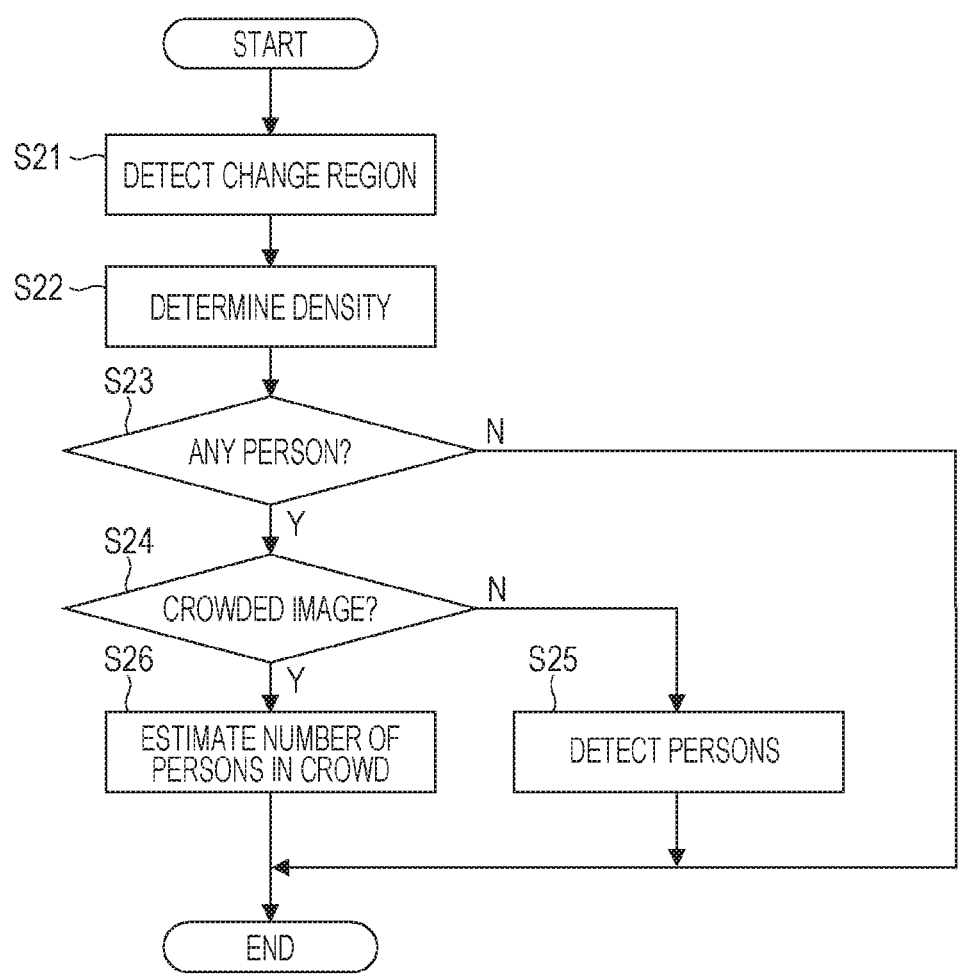
FIG. 7 is a diagram illustrating the procedure of processing performed by an image recognition unit according to the exemplary embodiment of the present invention.

The procedure of processing performed by the image recognition unit 201 will be described using FIG. 7.

When an image is input from the image capturing device 101 to the image recognition unit 201, in S21, the change-region detection unit 210 detects, from the input image, regions in which temporal changes are large and extracts the regions as a change-region image.

In S22, the density determination unit 220 performs a density determination on the input image on the basis of the change-region image extracted by the change-region detection unit 210. First, the density determination unit 220 determines whether the input image includes a person (S23). In a case where it is determined that the input image is an image including no person (No in S23), the process ends. In this case, the image recognition unit 201 outputs no person position. In a case where it is determined that the input image is an image including a person (Yes in S23), the process proceeds to S24.

In S24, the density determination unit 220 determines whether the input image is a crowded image. In a case where it is determined that the input image is an uncrowded image, the density determination unit 220 outputs a determination result indicating that the input image is an uncrowded image to the person detection unit 230. Thereafter, the process proceeds to S25.

In S25, on the basis of the determination result from the density determination unit 220 and the input image, the person detection unit 230 detects persons from the input image and acquires the positions of the persons (the position coordinates of target objects).

In a case where the density determination unit 220 determines in S24 that the input image is a crowded image, the density determination unit 220 outputs a determination result indicating that the input image is a crowded image to the crowd number-of-people estimation unit 240. Thereafter, the process proceeds to S26.

In S26, on the basis of the determination result from the density determination unit 220 and the input image, the crowd number-of-people estimation unit 240 estimates the number of persons in the input image and acquire the positions of the persons.

In this manner, on the basis of the determination result from the density determination unit 220, the image recognition unit 201 determines whether to use the person detection unit 230 or to use the crowd number-of-people estimation unit 240.

Note that in a case where the density determination unit 220 divides the input image into blocks and performs a density determination on each of the blocks, it is sufficient that processing in S22 to S26 is performed repeatedly on a block-by-block basis.

In the present exemplary embodiment, in a case where it is determined that the input image is an image including no person (No in S23), processing for detecting persons (S25) and processing for estimating the number of persons in a crowd (S26) are not performed. As a result, the image recognition unit 201 performs calculation less intensively.

In the present exemplary embodiment, in a case where the input image is large in size, the input image is divided into blocks of a predetermined size and a density determination is performed on each of the blocks. It is thereafter determined whether processing for detecting persons or processing for estimating the number of persons in a crowd is performed on a block-by-block basis. Thus the person detection unit 230 and the crowd number-of-people estimation unit 240 perform calculation less intensively.

In the present exemplary embodiment, in a case where it is determined that the input image is an uncrowded image (No in S24), the person detection unit 230 acquires the positions of persons (S25). In a case where it is determined that the input image is a crowded image, the crowd number-of-people estimation unit 240 acquires the positions of persons (S26).

In a situation in which a certain place is crowded with people, it is difficult for the person detection unit 230 to detect persons with high accuracy because the persons overlap one another in an input image and some portions of the persons are hidden. In contrast, in a situation in which persons are present in a scattered manner, the person detection unit 230 can detect the number of persons with higher accuracy than the crowd number-of-people estimation unit 240. Thus, in the present exemplary embodiment, the number of persons can be detected and estimated by an appropriate method in accordance with the determination result from the density determination unit 220.

Coordinate Transformation Performed by
Coordinate Transformation Units

When the image recognition processing (S20 in FIG. 3) as described above ends, the process proceeds to S30. In S30, the coordinate transformation units 401 to 40n transform each of the positions of persons acquired by the image recognition units 201 to 20n into world coordinates, using the calibration parameters acquired by the calibration units 301 to 30n.

Figure 8A:
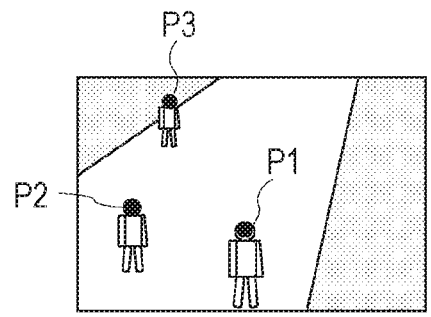
FIG. 8A is a diagram for described a method for acquiring a calibration parameter.
Figure 8B:
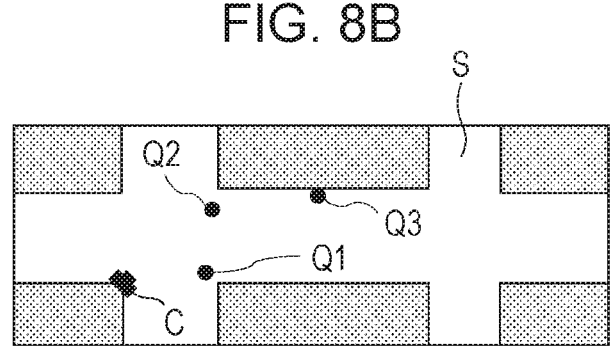
FIG. 8B is a diagram for described a method for acquiring a calibration parameter.

First, a calibration-parameter acquisition method performed by the calibration units 301 to 30n will be described using FIGS. 8A and 8B. FIG. 8A is an example of an image captured by a surveillance camera (image capturing device) to be calibrated, and P1, P2, and P3 denote the center positions of head portions of persons included in the image. FIG. 8B illustrates a map, and C denotes the position of the surveillance camera to be calibrated, and Q1, Q2, and Q3 denote the positions of the persons P1, P2, and P3, respectively.

When calibration parameters are acquired, for example, a certain calibration unit among the calibration units 301 to 30n displays, on the output device 14, the image illustrated in FIG. 8A and the map illustrated in FIG. 8B. An operator who performs calibration inputs P1, P2, and P3 (coordinates in the image) and Q1, Q2, and Q3 (world coordinates) using the input device 13. That is, the positions of the persons in the image are associated with the world coordinates on the map by specifying, via the input device 13, the positions of the persons in the image (position coordinates) and the positions of the persons on the map. In this case, when the positions of the persons in the input image are expressed as $(u_i, v_i)$ and the world coordinates on the map are expressed as $(X_i, Y_i)$ (note that, i=1, 2, . . . , N. N is the number of persons that is input), the relationship therebetween is expressed as in the following Expression (1).

$$(X_i, Y_i, 1)^T = H(u_i, v_i, 1)^T \quad (1)$$

In this case, H is a 3×3 transformation matrix, and T indicates vector transposition.

The certain calibration unit acquires a transformation matrix H from pairs of data, each pair including the position of a person in the image and world coordinates on the map, by performing regression estimation on the basis of Expression (1), and store the transformation matrix H as a calibration parameter. The same applies to the other calibration units.

Note that, in the above-described example, the calibration parameter is acquired by inputting the positions of persons on the image and on the map; however, the present invention is not limited to this method. For example, even in a case where no person is included in an image, a characteristic point of a background object in the image may be associated with a position on a map and the characteristic point and the position may be input. In this case, as the characteristic point of a background object to be specified in the image, a point located at the height corresponding to the center position of the head portion of a person is selected.

In this manner, each of the calibration units 301 to 30n acquires a calibration parameter for a corresponding one of the image capturing devices 101 to 10n.

Figure 9:
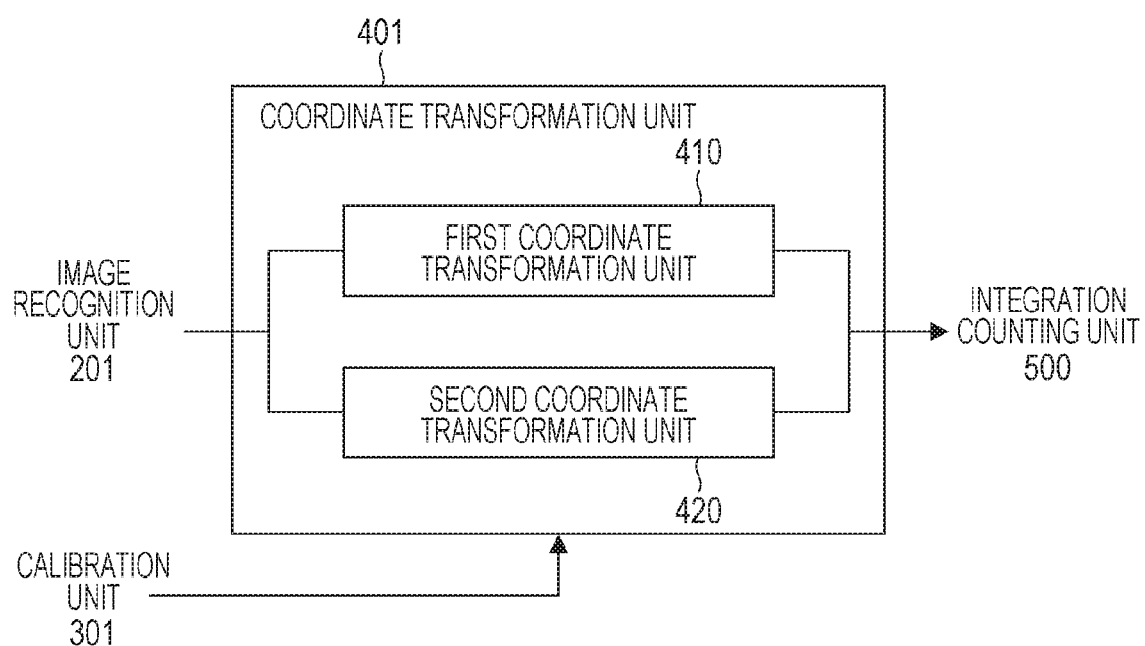
FIG. 9 is a diagram illustrating the configuration of a coordinate transformation unit according to the exemplary embodiment of the present invention.

In addition, each of the coordinate transformation units 401 to 40n has the first coordinate transformation unit 410 and the second coordinate transformation unit 420. The coordinate transformation units 401 to 40n have the same configuration. FIG. 9 illustrates the configuration of the coordinate transformation unit 401.

In a case where the image recognition unit 201 detects the positions of persons using the person detection unit 230, the first coordinate transformation unit 410 transforms the acquired positions of the persons into world coordinates. In a case where the image recognition unit 201 detects the positions of persons using the crowd number-of-people estimation unit 240, the second coordinate transformation unit 420 transforms the positions of the persons into world coordinates.

The first coordinate transformation unit 410 transforms, into world coordinates, position coordinates of the center of a head portion of each person in an image and output by the person detection unit 230 using the calibration parameter acquired by the calibration unit 301. Transformation is performed as expressed by the following Expression (2) when the position coordinates of the center of a head portion of a person in the image are expressed as (u, v) and the calibration parameter is H.

$$(X, Y, 1)^T = H(u, v, 1)^T \quad (2)$$

In this case, (X, Y) represents world coordinates to be acquired on a map, and T indicates vector transposition.

In a case where there are a plurality of persons in the image, for each person, the position coordinates are transformed into world coordinates on the basis of the above-described transformation (2).

The second coordinate transformation unit 420 transforms, into world coordinates, position coordinates of the center of a block where persons are present in an image and output by the crowd number-of-people estimation unit 240, using the calibration parameter acquired by the calibration unit 301. Transformation is performed in the same manner as the transformation performed by the first coordinate transformation unit 410. That is, the position coordinates of the center of the block are expressed as (u, v), and transformation is performed on the basis of Expression (2) using the calibration parameter H. Note that, unlike the first coordinate transformation unit 410, the second coordinate transformation unit 420 outputs acquired world coordinates a number of times which is equal to the number of persons estimated in the block. Note that the second coordinate transformation unit 420 may output the acquired world coordinates and the estimated number of persons.

Processing Performed by Integration Counting Unit

When the coordinate transformation processing (S30 in FIG. 3) as described above ends, the process proceeds to S40. In S40, the integration counting unit 500 integrates the world coordinates corresponding to the positions of persons and acquired by the coordinate transformation units 401 to 40n, and counts the number of persons on a region-by-region basis. Processing performed by the integration counting unit 500 will be described using FIG. 10.

First, in S41, the integration counting unit 500 acquires, from the coordinate transformation unit 401, world coordinates (person position coordinates) corresponding to the position of a person acquired from an image captured by the image capturing device 101.

In S42, the integration counting unit 500 acquires, on a map, a region corresponding to the world coordinates corresponding to the position of the person, and increment the number of persons for the acquired region by one. Note that, in the present exemplary embodiment, regions are set by pre-dividing the map into blocks of a predetermined area and for which the number of persons is counted. In addition, the number of persons in each region is set to zero in an initial state.

In S43, the integration counting unit 500 records the identification number (camera ID) of the image capturing device 101, which has captured the image. In this case, an identification number ID is set to ID=1 and is recorded in the acquired region.

The integration counting unit 500 performs count processing (S41 to S43) described above repeatedly a number of times equal to the number of person position coordinates. In this manner, for the image capturing device 101, the integration counting unit 500 performs processing. As a result of the processing, the number of target objects (persons) in the region whose image is captured by the image capturing device 101 is counted.

Figure 10:
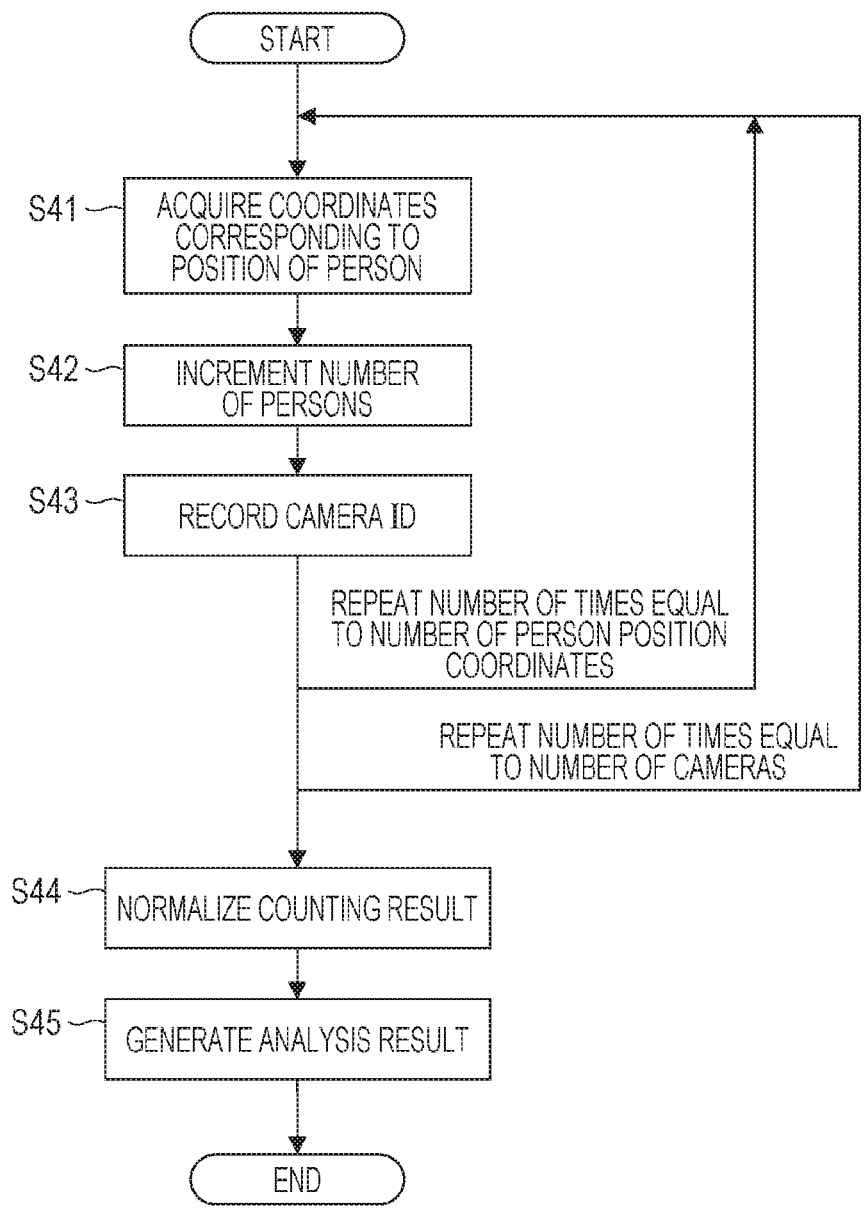
FIG. 10 is a diagram illustrating the procedure of processing performed by an integration counting unit according to the exemplary embodiment of the present invention.

The integration counting unit 500 repeatedly performs the same processing for the image capturing devices 102 to 10$n$ ("repeat number of times equal to number of cameras" in FIG. 10). That is, the integration counting unit 500 acquires, from the coordinate transformation units 402 to 40$n$, each of the world coordinates corresponding to the positions of persons acquired from images captured by the image capturing devices 102 to 10$n$ (S41). For each of the acquired world coordinates corresponding to the positions of the persons, a region on the map corresponding to the world coordinates is acquired, and the number of persons for the acquired region is incremented by one (S42). In this case, the identification number of the image capturing device that has captured the image is recorded in the acquired region (the region on the map) (S43). For example, in a case where a person position corresponding to a certain region is a person position in images captured by the image capturing device 101 and the image capturing device 102, ID=1 and ID=2 are recorded in the region. The integration counting unit 500 can integrate person position coordinates acquired at substantially the same time by referring to image capturing times recorded together with images. The integration counting unit 500 performs the count processing (S41 to S43) described above repeatedly a number of times equal to the number of person position coordinates.

After counting of the positions of persons is completed for all the image capturing devices 101 to 10$n$, the integration counting unit 500 normalizes, for each image-capturing area, the counting result (the number of target objects) on the basis of the degree of overlapping about the image capturing devices 101 to 10$n$ (S44). This is because an image of the same person is captured a plurality of times and is counted a plurality of times in a case where image capturing is performed on a certain region by a plurality of image capturing devices, and the number of persons needs to be corrected. When normalization is performed, for each of the regions on the map for which counting is performed, the identification numbers of image capturing devices are used. For example, in a case where the identification number IDs recorded in a certain region are 1 and 2, it is indicated that two image capturing devices perform image capturing on the region in an overlapping manner, and thus the counting result is divided by two. That is, the counting result of a certain region is corrected by being divided by the number of image capturing devices performing image capturing on the region. The integration counting unit 500 displays, on the image of each region on the map, the density of persons (target objects) in the region on the basis of the corrected counting result to generate an analysis result (S45).

Display Performed by Display Unit

Figure 11:
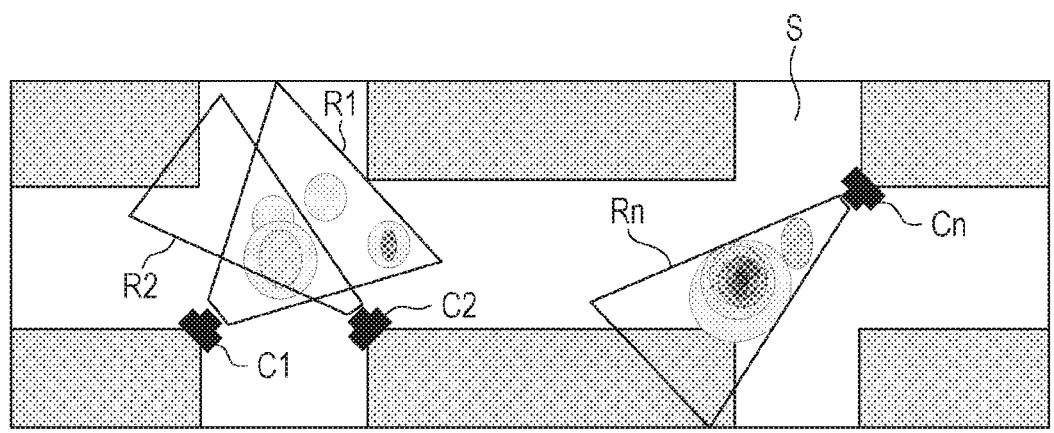
FIG. 11 is a diagram illustrating an example of display of a people flow analysis result.

When the number-of-persons count processing (S40 in FIG. 3) as described above ends, the process proceeds to S50. In S50, the display unit 600 (an output device) displays, on the map, the analysis result acquired by the integration counting unit 500. FIG. 11 illustrates an example of display of the analysis result.

In FIG. 11, it is indicated that the denser the region, the greater the number of persons. That is, FIG. 11 indicates the density of persons (a people crowded state) in accordance with shades of color (image information). The shades of color can be called people density display. The density of persons may be represented not by shades of color but by differences in color or pattern. Similarly to as in FIG. 4, C1 to Cn in FIG. 11 denote the positions of the image capturing devices 101 to 10$n$, respectively, and a white region S is a region where people move. In addition, R1 to Rn in FIG. 11 denote closed regions that are regions (image-capturing areas) of the image capturing devices 101 to 10$n$. For each of the regions, the number of persons can be counted. This region can also be called a surveillance-camera monitoring area.

When wide-area image capturing and monitoring are performed, there may be a case where an image of the entire area cannot be captured even with a plurality of installed surveillance cameras. When monitoring areas R1 to Rn are not displayed on the map, it is unclear, for each of the image capturing devices, which area the image capturing device is monitoring (on which area the image capturing device is performing image capturing). In addition, it is also unclear whether the entire region S is monitored by the image capturing devices 101 to 10$n$. By presenting the counting results and the counting target regions (monitoring areas) R1 to Rn on the display unit 600, image-capturing areas and non-image-capturing areas can be distinguished from each other.

Advantageous Effects of First Exemplary Embodiment

As described above, according to the present exemplary embodiment, even when images captured by a plurality of image capturing devices are used, the number of persons present in a certain region can be appropriately counted. More specifically, in the present exemplary embodiment, the positions of persons are acquired from each of the images from the image capturing devices 101 to 10$n$, the position coordinates of the persons are transformed into world coordinates using the calibration parameters, and thereafter the world coordinates are integrated to count the number of persons. Thus, even in a case where installation states (the size of a monitoring area of each surveillance camera) of a plurality of image capturing devices (surveillance cameras) are different from each other, the positions of persons acquired from the image capturing devices can be integrated, and the people densities of the image-capturing areas (monitoring areas) of the image capturing devices can be compared with each other. According to the present exemplary embodiment, even in a case where the installation states differ between the surveillance cameras, people density comparison can be performed, and even in a wide area that cannot be covered by one camera, the entire wide area can be viewed from above and its people crowded state can be grasped.

By using the people flow analysis apparatus 10 according to the present exemplary embodiment (or a people flow analysis system including the people flow analysis apparatus 10), for example, it can be detected whether a public space is crowded and the flow of people at the time when it is crowded can be grasped with accuracy. Thus, the people flow analysis apparatus 10 according to the present exemplary embodiment can be used to ease congestion at the time of an event or to guide people to escape in case of disaster.

Other Exemplary Embodiments

In the above-described exemplary embodiment, the case is described in which the position coordinates of persons in an image captured by a camera are acquired and the number of persons is counted. A motionlessness state of a region whose image is captured can further be grasped by acquiring the amount of travel of the persons. Such an exemplary embodiment will be described in the following.

Functional Configuration of People Flow Analysis Apparatus

Figure 12:
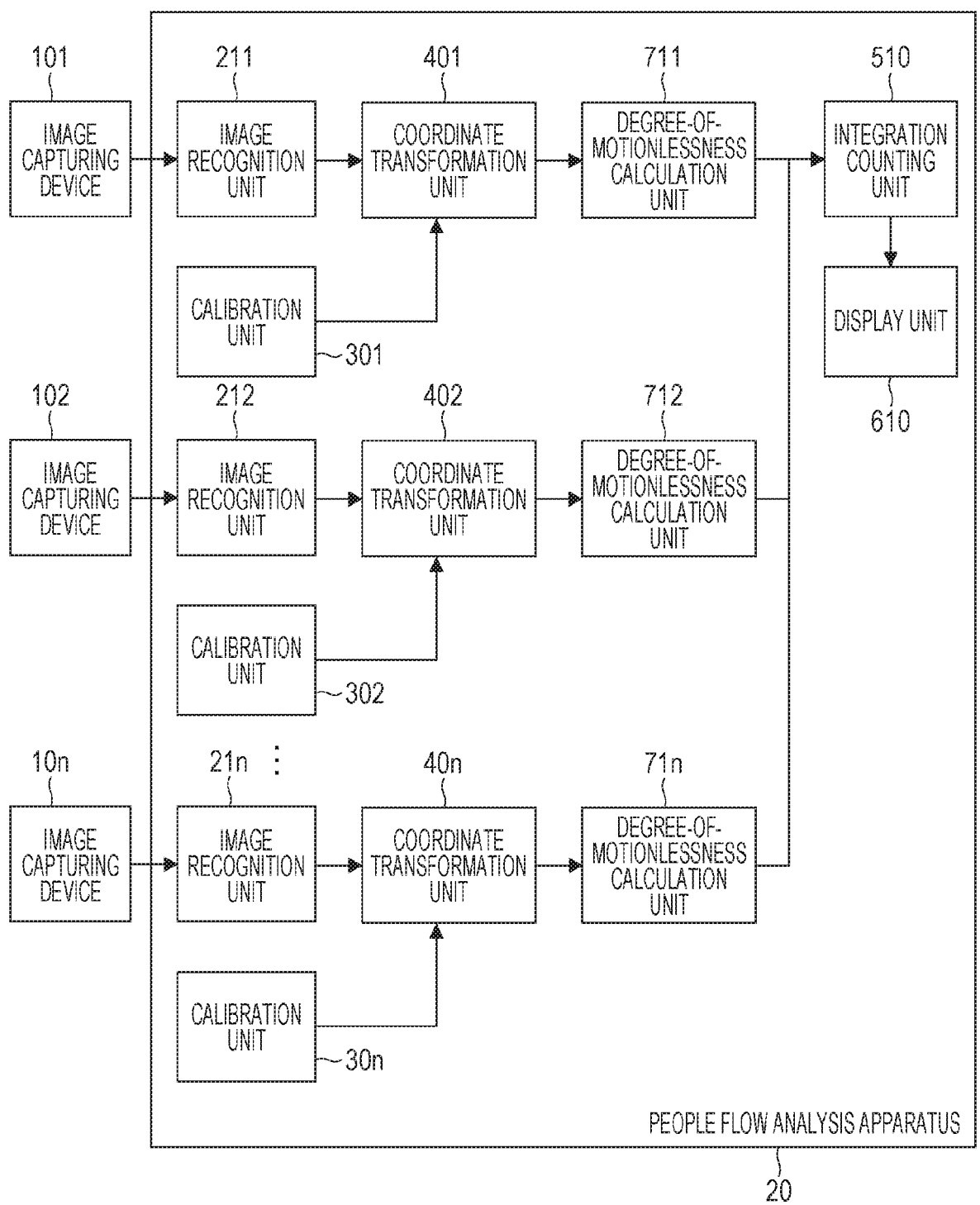
FIG. 12 is a diagram illustrating a functional configuration of a people flow analysis apparatus according to another exemplary embodiment of the present invention.

FIG. 12 illustrates a functional configuration of a people flow analysis apparatus 20 according to a present exemplary embodiment. In FIG. 12, structural elements denoted by the same reference numerals as those of the people flow analysis apparatus 10 illustrated in FIG. 2 have the same functions as those of the people flow analysis apparatus 10, and thus a description thereof will be omitted.

Image recognition units 211 to 21n perform image recognition processing on images received from the image capturing devices 101 to 10n, and acquire the positions of persons in the images and movement vectors (each movement vector having the amount of travel and a direction) of the persons.

Degree-of-motionlessness calculation units 711 to 71n calculate degrees of motionlessness from movement vectors acquired by the image recognition units 211 to 21n and world coordinates into which person position coordinates are transformed via the coordinate transformation units 401 to 40n.

An integration counting unit 510 integrates the world coordinates corresponding to the positions of persons and received from the coordinate transformation units 401 to 40n, counts the number of persons on a region-by-region basis, and integrates the degrees of motionlessness received from the degree-of-motionlessness calculation units 711 to 71n.

A display 610 displays image information indicating degrees of motionlessness on a map.

Processing Performed by People Flow Analysis System

Figure 13:
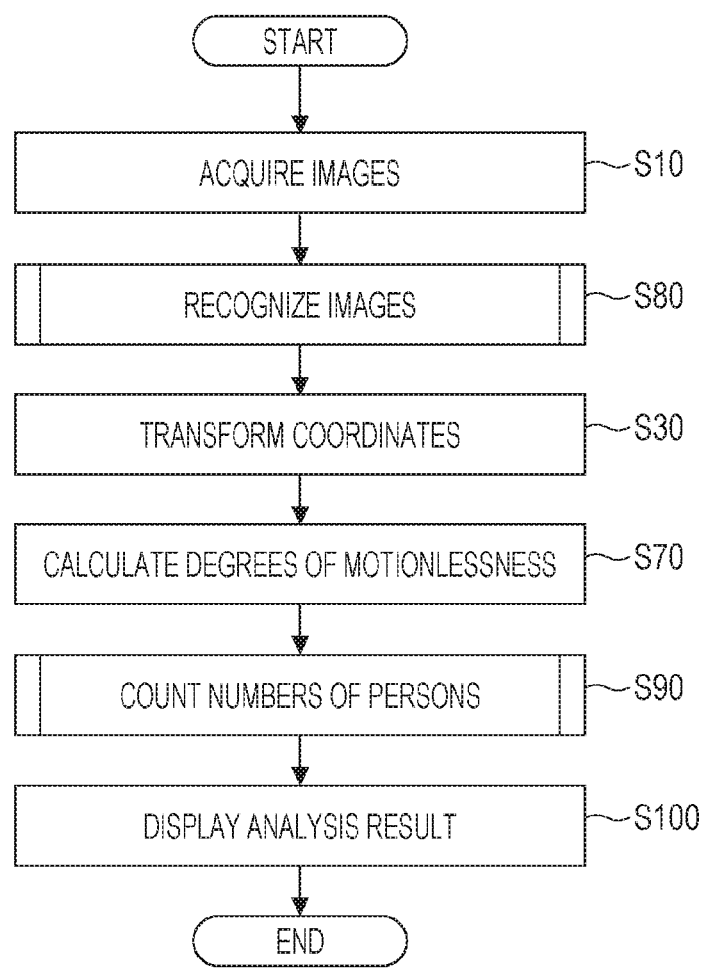
FIG. 13 is a diagram illustrating the procedure of processing performed by a people flow analysis system according to the other exemplary embodiment of the present invention.

An operation of the people flow analysis system will be described in accordance with a flow chart illustrated in FIG. 13. In FIG. 13, steps denoted by the same reference numerals as those of the flow chart illustrated in FIG. 3 are the same processing as those of the flow chart illustrated in FIG. 3, and thus a description thereof will be omitted.

In S80, the image recognition units 211 to 21n of the people flow analysis apparatus 20 perform image recognition processing on images acquired by the image capturing devices 101 to 10n, and acquire the positions of persons in the images together with movement vectors of the persons.

In S70, the degree-of-motionlessness calculation units 711 to 71n calculate degrees of motionlessness from the movement vectors acquired by the image recognition units 211 to 21n and world coordinates into which person position coordinates are transformed via the coordinate transformation units 401 to 40n.

In S90, the integration counting unit 510 integrates the world coordinates corresponding to the positions of the persons and received from the coordinate transformation units 401 to 40n, counts the number of persons on a region-by-region basis, and integrates the degrees of motionlessness received from the degree-of-motionlessness calculation units 711 to 71n.

In S100, the display 610 displays, on the world coordinates, an analysis result acquired by the integration counting unit 510.

Configuration of Image Recognition Unit

Figure 14:
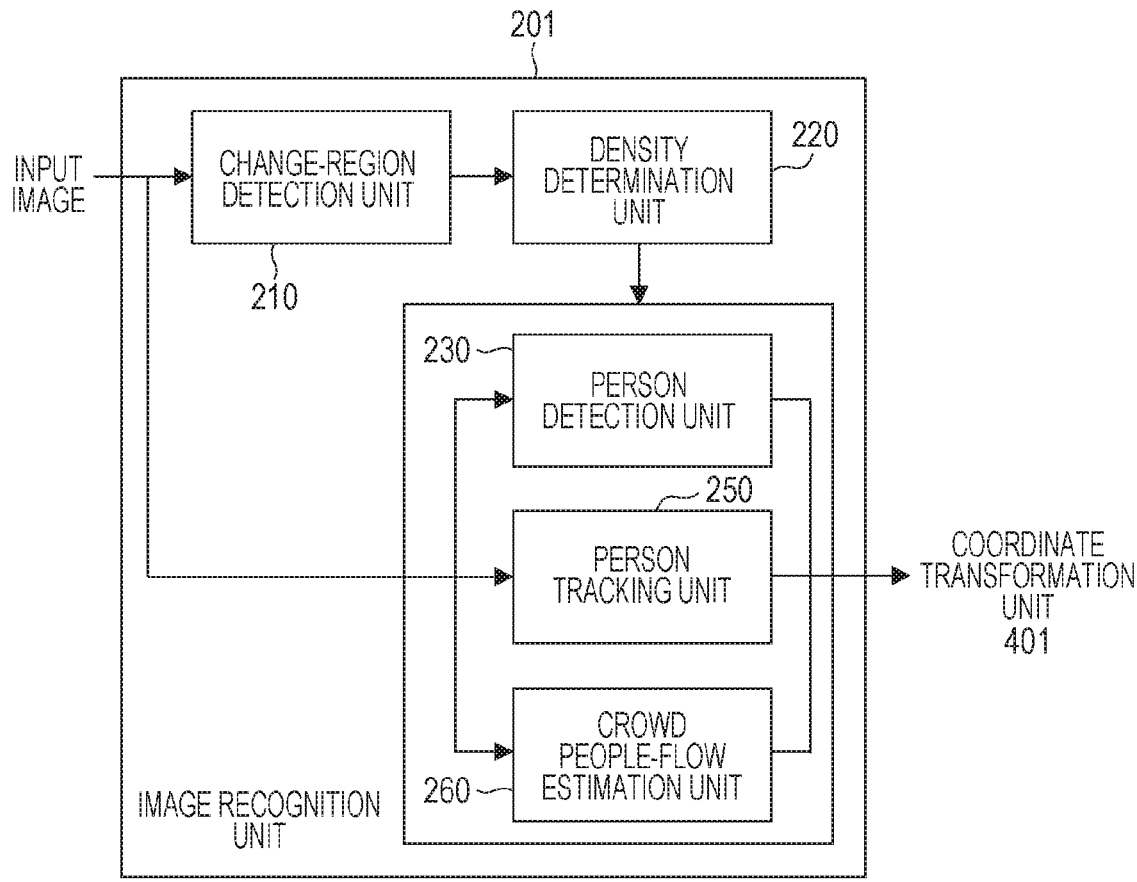
FIG. 14 is a diagram illustrating the configuration of an image recognition unit according to the other exemplary embodiment of the present invention.

FIG. 14 illustrates the configuration of the image recognition unit 211. In FIG. 14, structural elements denoted by the same reference numerals as those of the image recognition unit 201 illustrated in FIG. 5 have the same functions as those of the image recognition unit 201, and thus a description thereof will be omitted.

The image recognition unit 211 receives two frame images captured and acquired at subsequent and different times by the image capturing device 101. A person tracking unit 250 associates the positions of persons in a frame with the positions of persons in another frame, the positions of the persons being detected by the person detection unit 230, and acquire movement vectors of the persons.

Figure 15:
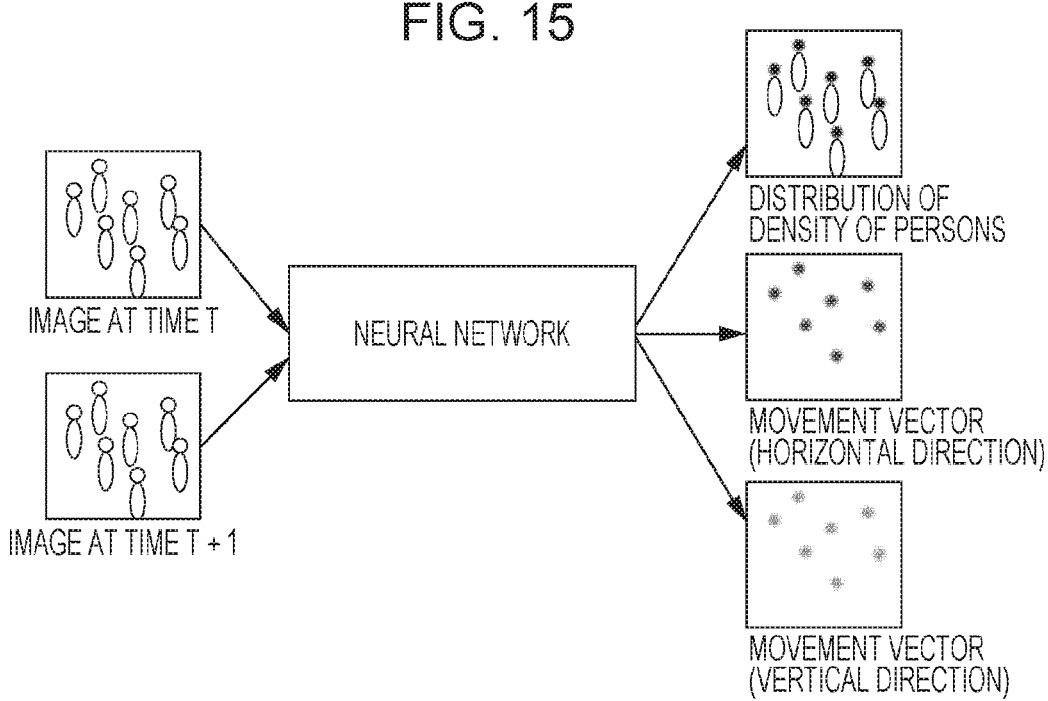
FIG. 15 is a diagram for describing the function of a crowd people-flow estimation unit according to the other exemplary embodiment of the present invention.

A crowd people-flow estimation unit 260 receives two frame images captured at subsequent and different times, and estimates the distribution of the density of persons and the distribution of movement vectors. The images input in this case are partial images each of which is a block among blocks into which an image acquired by the image capturing device 101 is divided. As a method for estimating the distribution of the density of persons and the distribution of movement vectors in images, for example, a method described in a document "Walach E., Wolf L. (2016) Learning to Count with CNN Boosting. In: Leibe B., Matas J., Sebe N., Welling M. (eds) Computer Vision—ECCV 2016. ECCV 2016. Lecture Notes in Computer Science, vol 9906. Springer, Cham" is used. In this document, the distribution of the density of persons is acquired from images using a neural network obtained in advance by performing machine learning. This method is applied to the present exemplary embodiment, and a neural network is studied in advance and used to perform estimation, the neural network receiving images of two subsequent frames and simultaneously estimating the distribution of the density of persons and the distribution of movement vectors in the images. FIG. 15 illustrates functions of the crowd people-flow estimation unit 260. In FIG. 15, among outputs from a neural network, dense portions by shading represent the positions of head portions of persons in the distribution of the density of persons. For movement vectors, the denser by shading the portion, the greater the amount of travel. In the example illustrated in FIG. 15, since the crowd moves horizontally, horizontal movement vectors have large values, and vertical movement vectors have small values. The image recognition unit 211 integrates the distribution of the density of persons from the neural network to acquire the number of persons in each block. In addition, an average movement vector of the block is acquired by averaging movement vectors from the neural network.

Processing Performed by Image Recognition Unit

Figure 16:
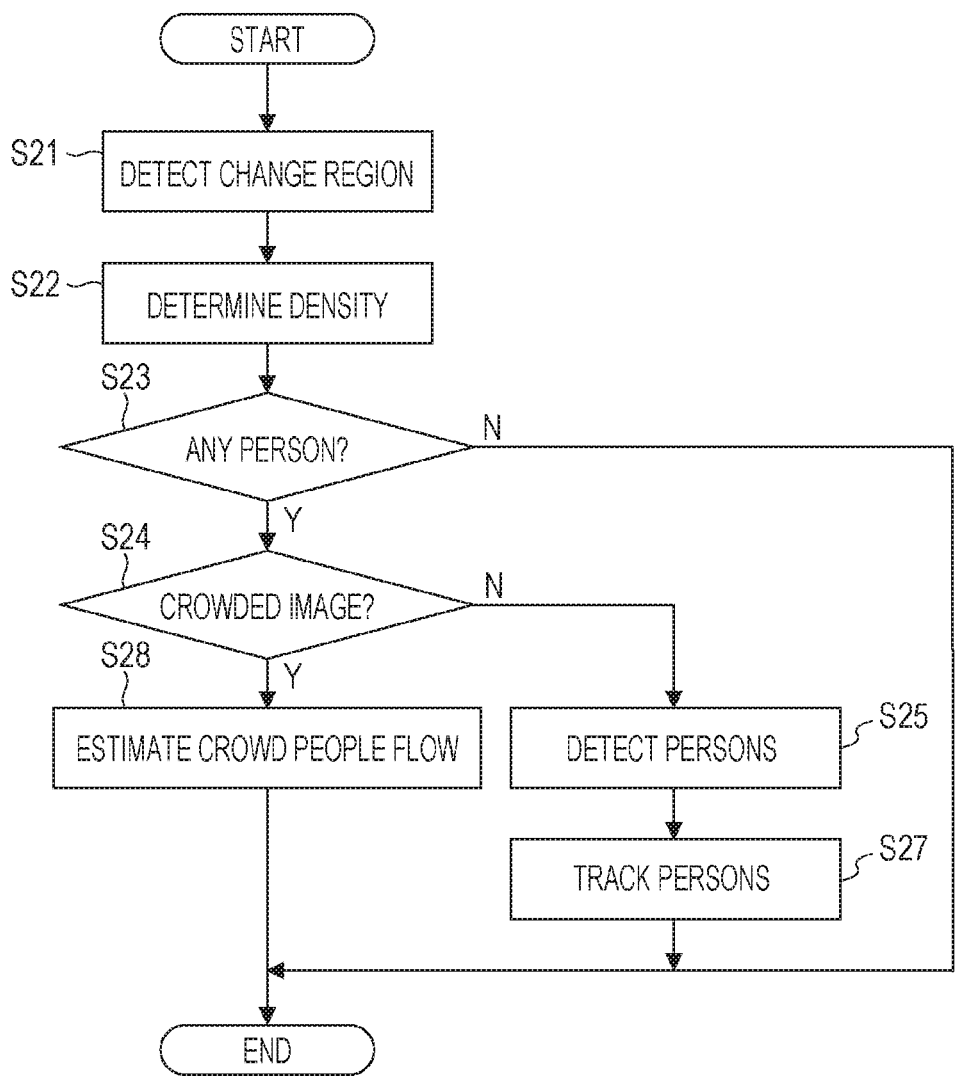
FIG. 16 is a diagram illustrating the procedure of processing performed by an image recognition unit according to the other exemplary embodiment of the present invention.

The procedure of processing performed by the image recognition unit 211 will be described using FIG. 16. In FIG. 13, steps denoted by the same reference numerals as those of the flow chart illustrated in FIG. 7 are the same processing as those of the flow chart illustrated in FIG. 7, and thus a description thereof will be omitted.

In S27, the person tracking unit 250 associates the positions of persons in a frame with the positions of persons in another frame, the positions of the persons being detected by the person detection unit 230, and acquire movement vectors of the persons.

In S28, the crowd people-flow estimation unit 260 receives two frame images captured at subsequent and different times, estimates the distribution of the density of persons and the distribution of movement vectors, and acquires the number of persons and an average movement vector for each block.

Processing Performed by Degree-of-Motionlessness Calculation Unit

The degree-of-motionlessness calculation units 711 to 71*n* calculate degrees of motionlessness from movement vectors of persons acquired by the image recognition units 211 to 21*n* and world coordinates into which person position coordinates are transformed via the coordinate transformation units 401 to 40*n*. A degree of motionlessness S of a certain region on a map is acquired from the following Expression (3), where D denotes the number of persons and M denotes the amount of travel in the region.

$$S = w1 \times D - w2 \times M \tag{3}$$

Here, w1 and w2 are weight parameters adjusted in advance to acquire a degree of motionlessness, and have positive values. That is, the greater the number of persons or the smaller the amount of travel, the greater the value output from Expression (3). Note that, as the amount of travel M, the size of a movement vector is used.

Processing Performed by Integration Counting Unit

The integration counting unit 510 integrates the world coordinates corresponding to the positions of persons and received from the coordinate transformation units 401 to 40*n*, counts the number of persons on a region-by-region basis, and integrates the degrees of motionlessness received from the degree-of-motionlessness calculation units 711 to 71*n*. The integration counting unit 510 acquires, for each region on the map, a degree of motionlessness on a camera-by-camera basis, and performs integration such that, for a region on which image capturing is performed by a plurality of cameras in an overlapping manner, the average of degrees of motionlessness is treated as the degree of motionlessness of the region.

Display Performed by Display Unit

Figure 17:
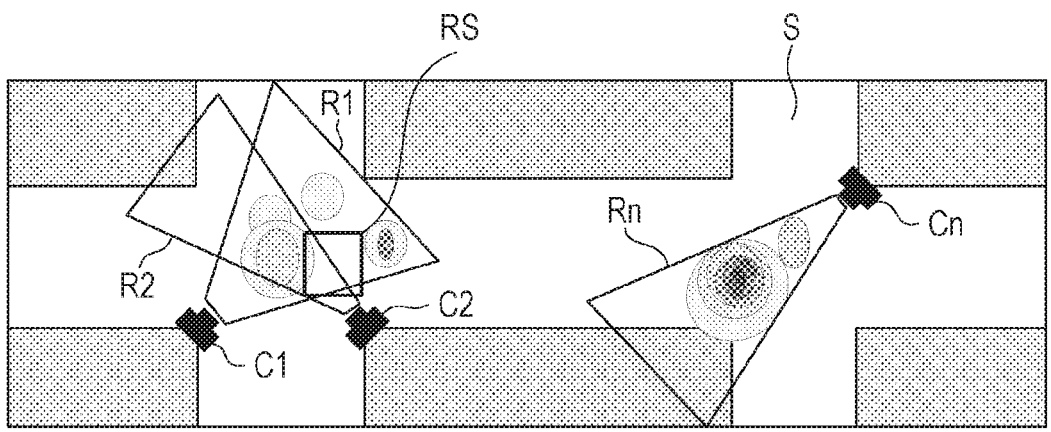
FIG. 17 is a diagram illustrating an example of display of a people flow analysis result according to the other exemplary embodiment of the present invention.

The display 610 (an output device) displays, on the world coordinates, the analysis result acquired by the integration counting unit 510. FIG. 17 illustrates an example of display of the analysis result. In the example illustrated in FIG. 17, the density of persons in each region is represented by shades of color, and a region whose degree of motionlessness is greater than or equal to a predetermined value is treated as a motionless region and indicated by a thick frame RS. When the map in FIG. 17 is viewed, it can be estimated that the density of persons increases because a region adjacent to a motionless place includes a region whose density of persons is at a medium level. In this manner, a place that may be crowded next can be estimated by displaying a motionless place together with the density of persons on the map. Note that, other than display of a motionless region with a frame, display based on other image information may also be performed such as coloring of the region.

In the above-described exemplary embodiment, the degrees of motionlessness are calculated from the movement vectors of persons acquired by the image recognition units 211 to 21*n* and world coordinates into which person position coordinates are transformed via the coordinate transformation units 401 to 40*n*. Other than with this configuration, the degree of motionlessness may also be calculated from a result obtained by an integration counting unit integrating movement vectors of persons and person position coordinates acquired on a camera-by-camera basis.

Modification

In the above-described exemplary embodiments, the examples have been described in which the present invention is applied in a case where persons are detected from images; however, the present invention may also be applied to a case where objects other than persons are detection targets.

In the above-described exemplary embodiments, the image recognition unit 201 is configured such that either the person detection unit 230 or the crowd number-of-people estimation unit 240 performs processing on the basis of a determination result from the density determination unit 220; however, the present invention is not limited thereto. For example, the image recognition unit 201 may be constituted by the person detection unit 230 and the crowd number-of-people estimation unit 240, and switching may be performed between processing performed by the person detection unit 230 and processing performed by the crowd number-of-people estimation unit 240 on the basis of a processing result from the person detection unit 230 and a processing result from the crowd number-of-people estimation unit 240. In this case, overlapping of persons is determined on the basis of a detection result from the person detection unit 230, and switching from the person detection unit 230 to the crowd number-of-people estimation unit 240 is performed in a case where many persons overlap one another. Alternatively, in a case where an estimation result from the crowd number-of-people estimation unit 240 shows that the estimated number of persons has decreased, switching from the crowd number-of-people estimation unit 240 to the person detection unit 230 is performed.

In the above-described exemplary embodiments, processing is performed by either the person detection unit 230 or the crowd number-of-people estimation unit 240 in the image recognition unit 201; however, processing may be performed by both of the person detection unit 230 and the crowd number-of-people estimation unit 240 and these results may be integrated.

In the above-described exemplary embodiment, at least some of the image recognition units 201 to 20*n*, the calibration units 301 to 30*n*, the coordinate transformation units 401 to 40n, and the integration counting unit 500 may be implemented by hardware. In a case where at least some of the above-described units are implemented by hardware, for example, it is sufficient that a dedicated circuit is automatically generated in a field-programmable gate array (FPGA) by using a predetermined compiler from a program for realizing steps. In addition, similarly to as in the case of an FPGA, hardware implementation may be achieved by forming a gate array circuit. In addition, hardware implementation may also be achieved by using an application specific integrated circuit (ASIC).

In the above-described exemplary embodiment, the people flow analysis apparatus 10 includes the input device 13 and the output device 14 (the display unit 600); however, at least one of the input device 13 and the output device 14 may be provided outside the people flow analysis apparatus 10, and may be connected to the people flow analysis apparatus 10 via an appropriate I/F.

In the above-described exemplary embodiments, the coordinate transformation units 401 to 40n transform position coordinates of persons into world coordinates; however, as long as appropriate calibration parameters are acquired, coordinates other than world coordinates may also be used as coordinates in a common coordinate system.

In addition, the present invention may also be realized by executing the following processing. That is, software (a program) implementing one or more functions of the above-described exemplary embodiments is supplied to a system or an apparatus via a network or various types of storage mediums, and the present invention is realized by processing in which one computer (or a CPU, a microprocessor unit (MPU), or the like) or more of the system or the apparatus read out and execute the program.

The present invention is not limited to the above-described exemplary embodiments, and various changes and modifications may be made without departing from the gist and scope of the present invention. In order to make the scope of the present invention public, the following claims are attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A people flow analysis apparatus comprising:
one or more processors; and
at least one memory storing executable instructions, which when executed by the one or more processors, cause the people flow analysis apparatus to:
determine whether each of input images captured by a plurality of image capturing devices is a crowded image, based on a change-region extracted from the each of input images by using a background image;
acquire positions of persons from each of the input images, wherein the acquired positions of the persons are positions in image coordinates for each of image capturing devices which captured each of the input images;
transform the image coordinates of the acquired position into coordinates in a common coordinate system;
integrate the positions of the persons detected from at least two images among the images captured for each of the image capturing devices; and
count the number of persons in each area by using the integrated positions indicating each of persons,
wherein, for a target image among the input images,
in a case where the target image is not the crowded image, the acquired position is acquired by extracting positions of each of persons extracted from the target image,
in a case where the target image is the crowded image, the acquired position is acquired by estimating numbers of persons for each block of the target image by a trained model, and
the acquired positions for each of the persons or the each block are transformed into the common coordinate system.

2. The people flow analysis apparatus according to claim 1, wherein the positions of the persons extracted from at least two of the input images are integrated into a same person, when the transformed positions of the persons acquired from at least two of the input images simultaneously captured by different image capturing devices are a same position in the common coordinate system.

3. The people flow analysis apparatus according to claim 1, wherein the common coordinate system are world coordinates, and the positions in image coordinates of the images are transformed into the world coordinates using calibration parameters for each of the image capturing devices.

4. The people flow analysis apparatus according to claim 1, wherein the one or more processors causes the people flow analysis apparatus to output the counted number of persons on a map.

5. The people flow analysis apparatus according to claim 4, wherein the one or more processors causes the people flow analysis apparatus to output a color or a pattern corresponding to a density of the persons based on the counted number of persons.

6. The people flow analysis apparatus according to claim 4, wherein the one or more processors causes the people flow analysis apparatus to output the integrated positions of each of the plurality of image capturing devices on a map.

7. The people flow analysis apparatus according to claim 6, the map indicates an image-capturing area of each of the plurality of image capturing devices.

8. The people flow analysis apparatus according to claim 1, wherein the one or more processors causes the people flow analysis apparatus to detect the persons in the images.

9. The people flow analysis apparatus according to claim 1, wherein the one or more processors causes the people flow analysis apparatus to detect, from the image, a region whose temporal change is greater than a predetermined amount as a change region, and to determine whether the input image is the crowded image on the basis of the size of the change region.

10. The people flow analysis apparatus according to claim 1, wherein the number of persons is corrected based on overlapping of image-capturing areas of the plurality of image capturing devices.

11. The people flow analysis apparatus according to claim 1, wherein the crowded state of a target area is determined by an amount of travel of a target object from each of a plurality of images captured at different times by the plurality of image capturing devices.

12. The people flow analysis apparatus according to claim 1,
wherein the one or more processors causes the people flow analysis apparatus to calculate a degree of motionlessness of the persons in the each areas by using at least one of a result of the acquired positions and a result obtained from a plurality of images captured at different times by the plurality of image capturing devices.

13. The people flow analysis apparatus according to claim 12, wherein the degree of motionlessness is displayed on a map.

14. A people flow analysis system comprising:
the people flow analysis apparatus according to claim 1; and
a plurality of image capturing devices each capturing a corresponding one of a plurality of areas.

15. A non-transitory computer readable medium storing a program causing a computer to function as units of the people flow analysis apparatus according to claim 1.

16. The people flow analysis apparatus according to claim 1, wherein the one or more processors causes the people flow analysis apparatus to:
estimate movement vectors of persons for each block in the input images captured by one of the image capturing devices based on the input images captured by each of the image capturing devices and a trained-model; and
integrate the estimated movement vectors and the number of persons for each area in the common coordinate system.

17. A people flow analysis method comprising:
determining whether each of input images captured by a plurality of image capturing devices is a crowded image, based on a change-region extracted from the each of input images by using a background image;
acquiring positions of persons from each of the input images, wherein the acquired positions of the persons are positions in image coordinates for each of image capturing devices which captured each of the input images;
transforming the image coordinates of the acquired position into coordinates in a common coordinate system;
integrating the positions of the persons detected from at least two images among the images captured for each of the image capturing devices; and
counting the number of persons in each area by using the integrated positions indicating each of persons,
wherein, for a target image among the input images,
in a case where the target image is not the crowded image, the acquired position is acquired by extracting positions of each of persons extracted from the target image,
in a case where the target image is the crowded image, the acquired position is acquired by estimating numbers of persons for each block of the target image by a trained model, and
the acquired positions for each of the persons or the each block are transformed into the common coordinate system.

\* \* \* \* \*